United States Patent [19]

Yoshiji et al.

[11] Patent Number: 5,160,011

[45] Date of Patent: Nov. 3, 1992

[54] WORKING LINE

[75] Inventors: Takeo Yoshiji; Yutaka Sato; Akira Takeshima; Teruo Yoshioka, all of Sayama, Japan

[73] Assignee: Honda Giken Kogyo Kabushiki Kaisha, Tokyo, Japan

[21] Appl. No.: 517,798

[22] Filed: May 2, 1990

[30] Foreign Application Priority Data

May 13, 1989 [JP] Japan .................................. 1-119974
Nov. 8, 1989 [JP] Japan ............................. 1-129673[U]

[51] Int. Cl.$^5$ ............................................ B65G 15/64
[52] U.S. Cl. ............................... 198/345.3; 198/346.1
[58] Field of Search ............... 198/345.3, 346.1, 345.1, 198/346.2, 456.3, 465.1

[56] References Cited

U.S. PATENT DOCUMENTS

| | | | |
|---|---|---|---|
| 3,650,373 | 3/1972 | Kern et al. | 198/345.3 |
| 3,858,707 | 1/1975 | Block et al. | 198/345.3 X |
| 4,371,075 | 2/1983 | Erlichman | 198/345.3 |
| 4,411,354 | 10/1983 | Thibault et al. | 198/465.1 |
| 4,492,297 | 1/1985 | Stricht | 198/345.3 |
| 4,586,702 | 5/1986 | Chambers | 198/345.3 X |
| 4,660,280 | 4/1987 | Asai et al. | 198/345.1 X |
| 4,706,796 | 11/1987 | Chambers | 198/346.1 |
| 4,718,533 | 1/1988 | Nussbaumer et al. | 198/346.1 |

FOREIGN PATENT DOCUMENTS

| | | |
|---|---|---|
| 0318965 | 11/1988 | European Pat. Off. . |
| 684800 | 12/1952 | United Kingdom . |
| 1593738 | 11/1977 | United Kingdom . |
| 2021447A | 12/1979 | United Kingdom . |
| 2186249A | 7/1986 | United Kingdom . |

Primary Examiner—Robert P. Olszewski
Assistant Examiner—Cheryl L. Gastineau
Attorney, Agent, or Firm—Armstrong, Nikaido, Marmelstein, Kubovcik & Murray

[57] ABSTRACT

A working line having a plurality of work stations arranged in series and a free-flow transport conveyor for transporting workpieces to the work stations. An outer frame supporting the conveyor extends over the work stations. A jig base is provided in each of the work stations and is inserted into a framed space of the outer frame. A jig is provided on each of the jig base supporting and positioning each of the workpieces on the transport conveyor at the respective work station. The transport conveyor includes a main transport conveyor on the outer frame, a plurality of pallets riding on the main transport conveyor, and a return conveyor supported on the outer frame under the transport conveyor for returning empty pallets to a starting end of the line. The transport conveyor and return conveyor comprise, respectively, a pair of right and left conveying members provided in parallel to each other on both lateral sides thereof. The outer frame includes a plurality of supporting frames in portal shape provided at a predetermined pitch along the working line, a pair of right and left guide members for the transport conveyor extendedly provided between upper portions of the supporting frames for guiding the conveying members of the transport conveyor, and a pair of right and left guide members for the return conveyor extendedly provided between lower portions of the supporting frames for guiding the conveying members of the return conveyor.

3 Claims, 10 Drawing Sheets

WORKING LINE

BACKGROUND OF THE INVENTION

This invention relates to a working line in which a plurality of work stations are arranged in series and workpieces are conveyed to these work stations by a free-flow type of conveyor.

In a conventional working line, conveyors are divided depending on the pitch of the arrangement of the work stations. An outer frame of each conveyor is installed between jig bases of adjacent work stations. Members for bridging the front and the rear conveyors as well as jigs are arranged to be mounted on each of the jig bases.

In the above-mentioned working line, the overall cost of the conveyors is expensive and it takes a long time for installation. Further, whenever the pitch of the work stations is changed, the conveyors must be replaced and, therefore, the modification of the working line is troublesome.

SUMMARY OF THE INVENTION

In view of the above problems, this invention has an object of providing a working line in which the installing of the transporting apparatus and the changing of the working line are easy and the cost of the apparatus is low.

In order to attain the above-mentioned object, the working line of this invention has a plurality of work stations which are arranged in series and a free-flow type transport conveyor for transporting workpieces to the work stations. An outer frame to support the conveyor is formed such that the outer frame extends over a plurality of the work stations. A jig base is provided in each of the work stations such that the jig base is inserted into a framed space of the outer frame. A jig is provided on the jig base for supporting and positioning each of the workpieces placed on the transport conveyor.

The installing of the transport apparatus can be performed easily in that the outer frame of framed construction for the transport conveyor is installed such that the jig base of each work station can be inserted into the framed space of the outer frame and the jig is mounted on the jig base. Further, since the jig base and the conveyor are independent of each other, the pitch of arrangement of the work stations can be easily changed by shifting the location of the jig base.

When the working line is in operation, the workpieces are transported to a plurality of work stations, and in each work station each of the workpieces is supported in a positioned condition for having a predetermined operation performed on it.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF A PREFERRED EMBODIMENT

Figure 12:
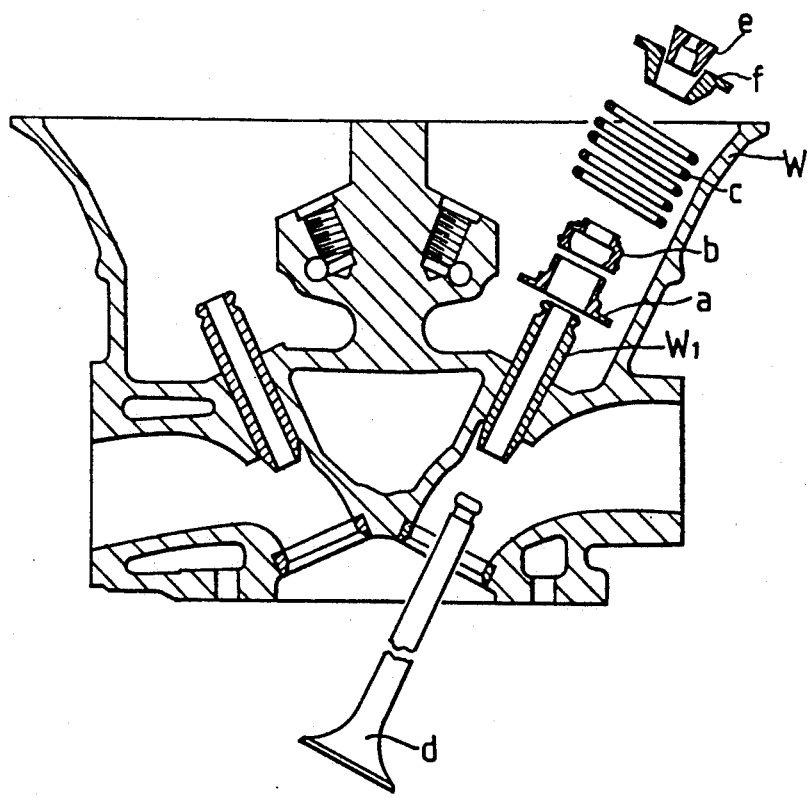
FIG. 12 is a partly exploded sectional view showing a cylinder head as a workpiece and parts such as a valve and the like to be assembled thereto.

An embodiment illustrated in the drawings shows the present invention as applied to a valve assembly line in which a spring seat a, a stem seal b, a valve spring c, a valve d and a retainer f with a cotter e are assembled in succession to a cylinder head W of an engine provided with a valve guide $W_1$, as shown in FIG. 12.

Figure 1:
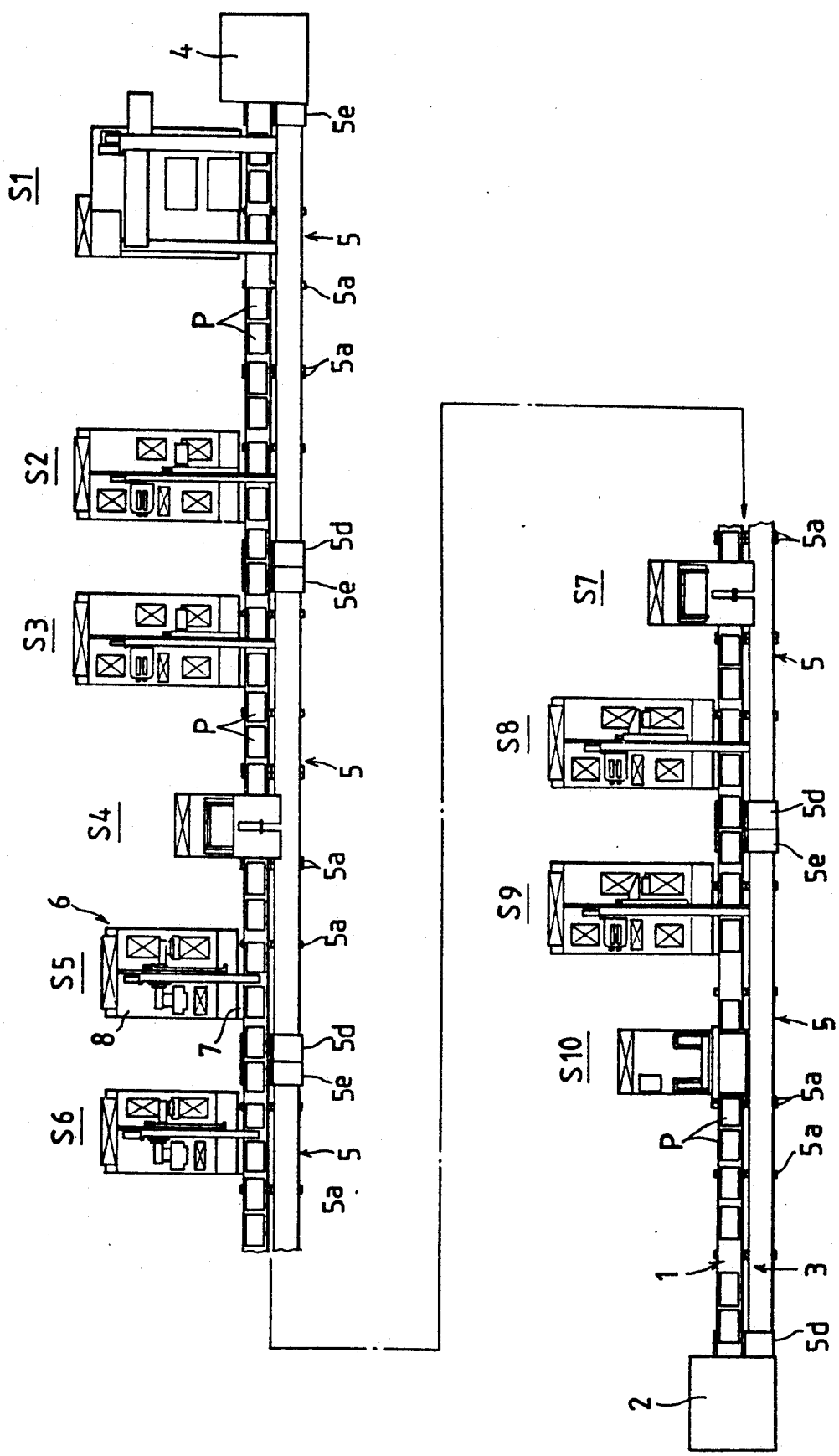
FIG. 1 is a plan view of an assembly line for assembling a valve to a cylinder block to which this invention is applied.

As shown in FIG. 1, ten work stations in the assembly line are provided in series. The cylinder heads W (which are the workpieces) are arranged to be transported to the work stations by a free-flow transport conveyor 1 with the cylinder heads W carried on pallets P.

In the first work station S1, the cylinder heads W are placed on pallets P. In the second work station S2, spring seats a and stem seals b are assembled to the valve guides $W_1$ for the inlet valves of the cylinder head. In the third work station S3, spring seats a and stem seals b are assembled to the valve guides $W_1$ for the exhaust valves of the cylinder head. In the fourth work station S4, the cylinder heads W are turned upside down. In the fifth and the sixth work stations S5, S6, valves d for the inlet side and for the exhaust side are respectively assembled to valve guides $W_1$ of the inlet side and of the exhaust side. In the seventh work station S7, the cylinder heads W are once again turned upside down. In the eighth work station S8, valve springs c and retainers f for the inlet valves are assembled. In the ninth work station S9, valve springs c and retainers f for the exhaust valves are assembled. In the tenth work station S10, a leak test is performed.

Thereafter, the cylinder heads W are removed from the pallets P between the tenth work station S10 and a lift down apparatus 2 which is located at the terminal end of the assembly line. The empty pallets P are moved to a return conveyor 3 which is located below the transport conveyor 1 by the lift down apparatus 2. The pallets P returned to the starting end of the assembly line by the return conveyor 3 are moved to the transport conveyor 1 by a lifting apparatus 4.

Figure 2:
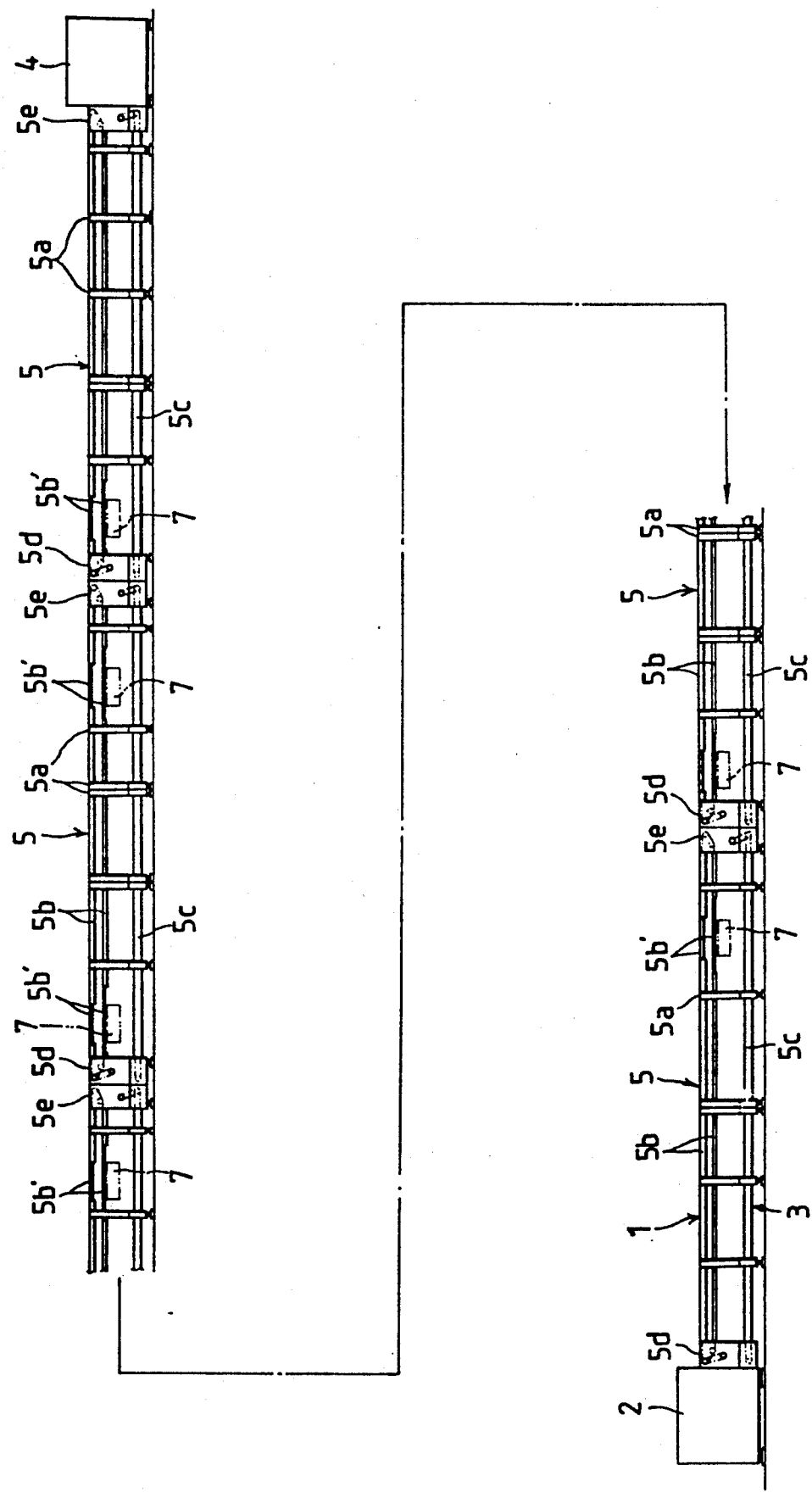
FIG. 2 is a front view of conveyors to be used in the assembly line of FIG. 1.

It may be possible to respectively construct the transport conveyor 1 and the return conveyor 3 as single conveyors which extend along the entire length of the assembly line. However, conveyors thus constructed would be too long to handle with ease. Consequently, the assembly line in this embodiment is divided into four sections, as shown in FIG. 2.

An outer frame 5 which is common to both conveyors 1, 3 is formed in each section and, by communicating the outer frames 5 of each section to each other, a transport apparatus which extends along the entire length of the assembly line is constructed.

Figure 3:
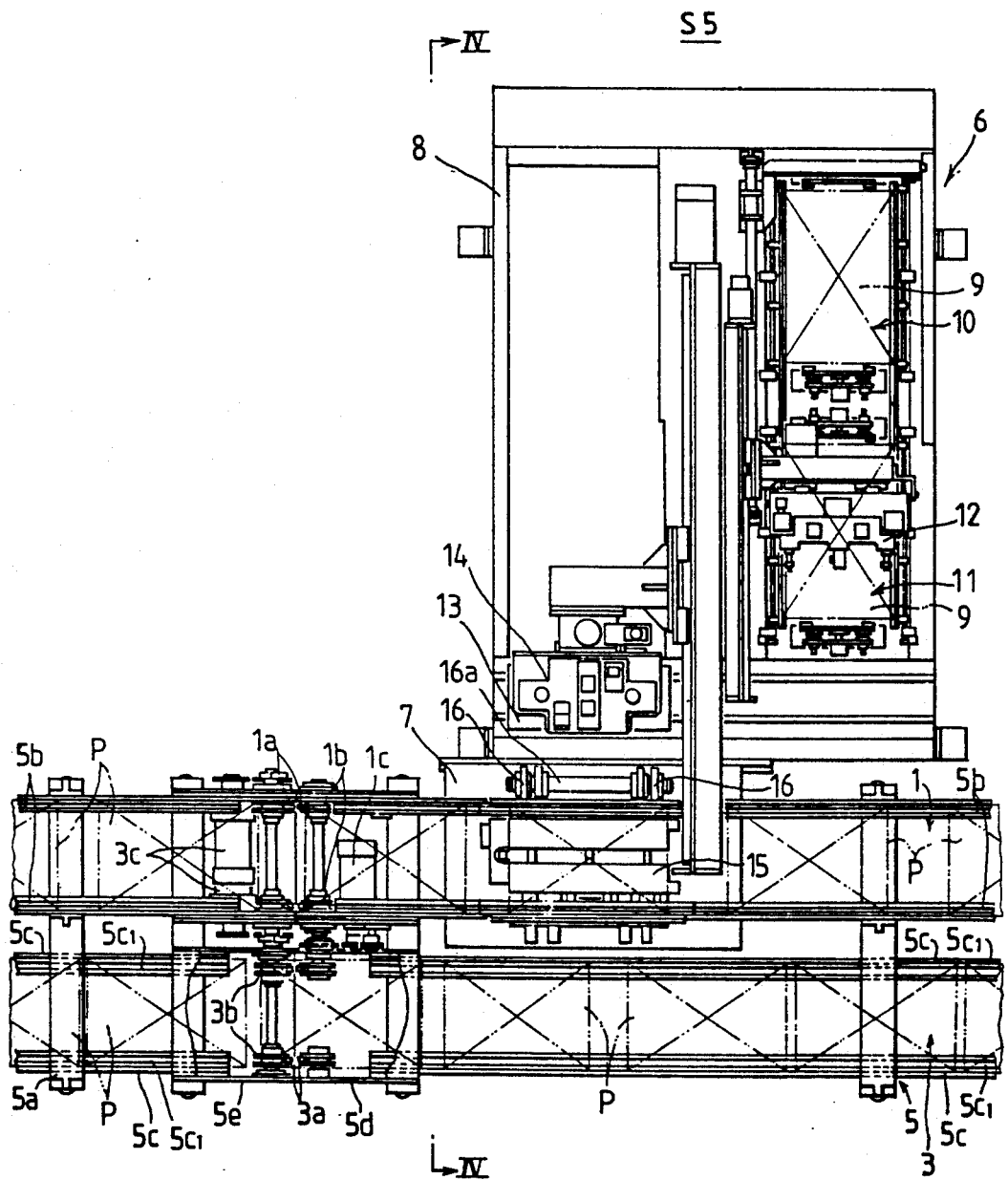
FIG. 3 is an enlarged plan view of an important portion shown in FIG. 1.
Figure 4:
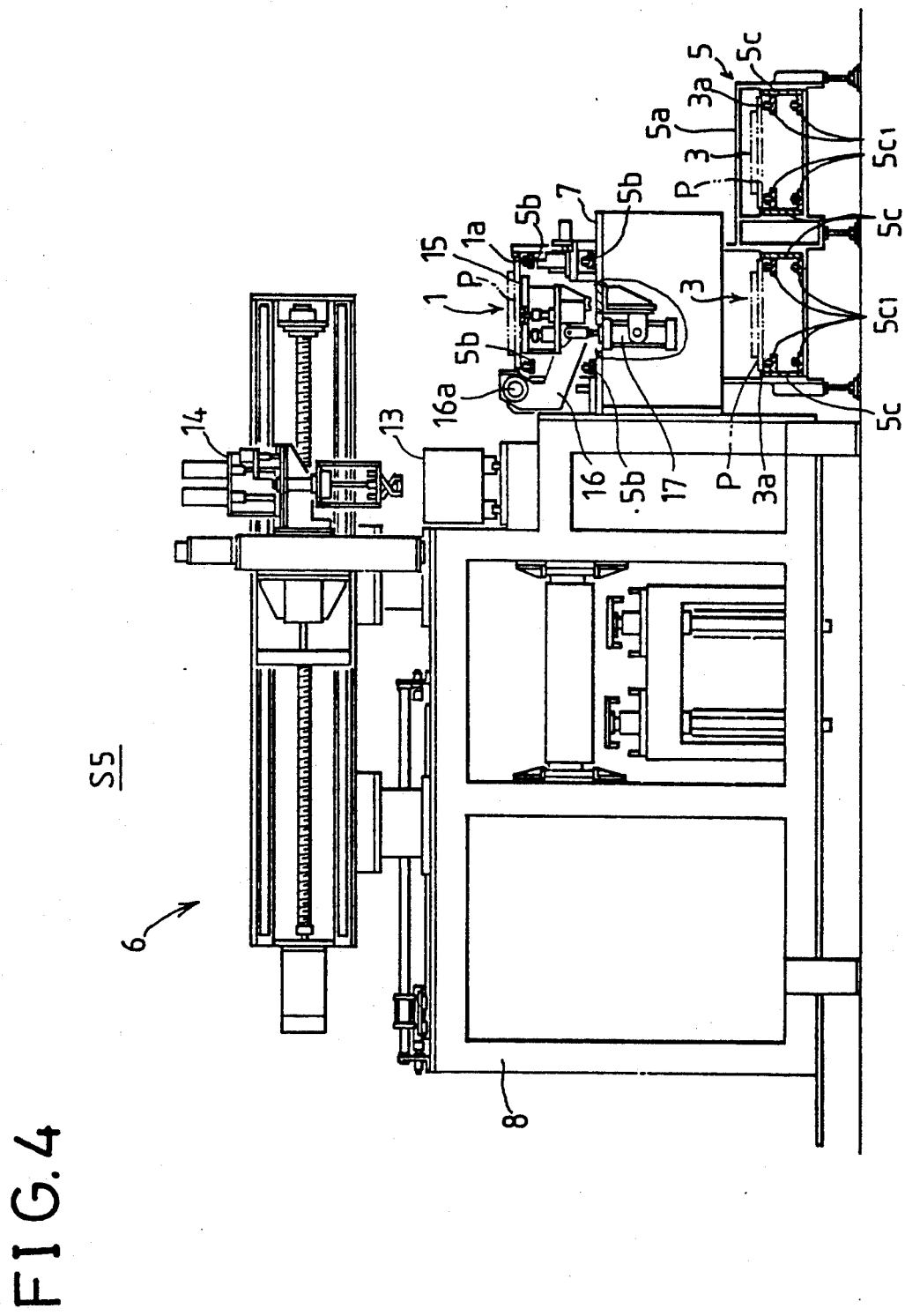
FIG. 4 is a sectional side view taken along the line IV—IV of FIG. 3.
Figure 5:
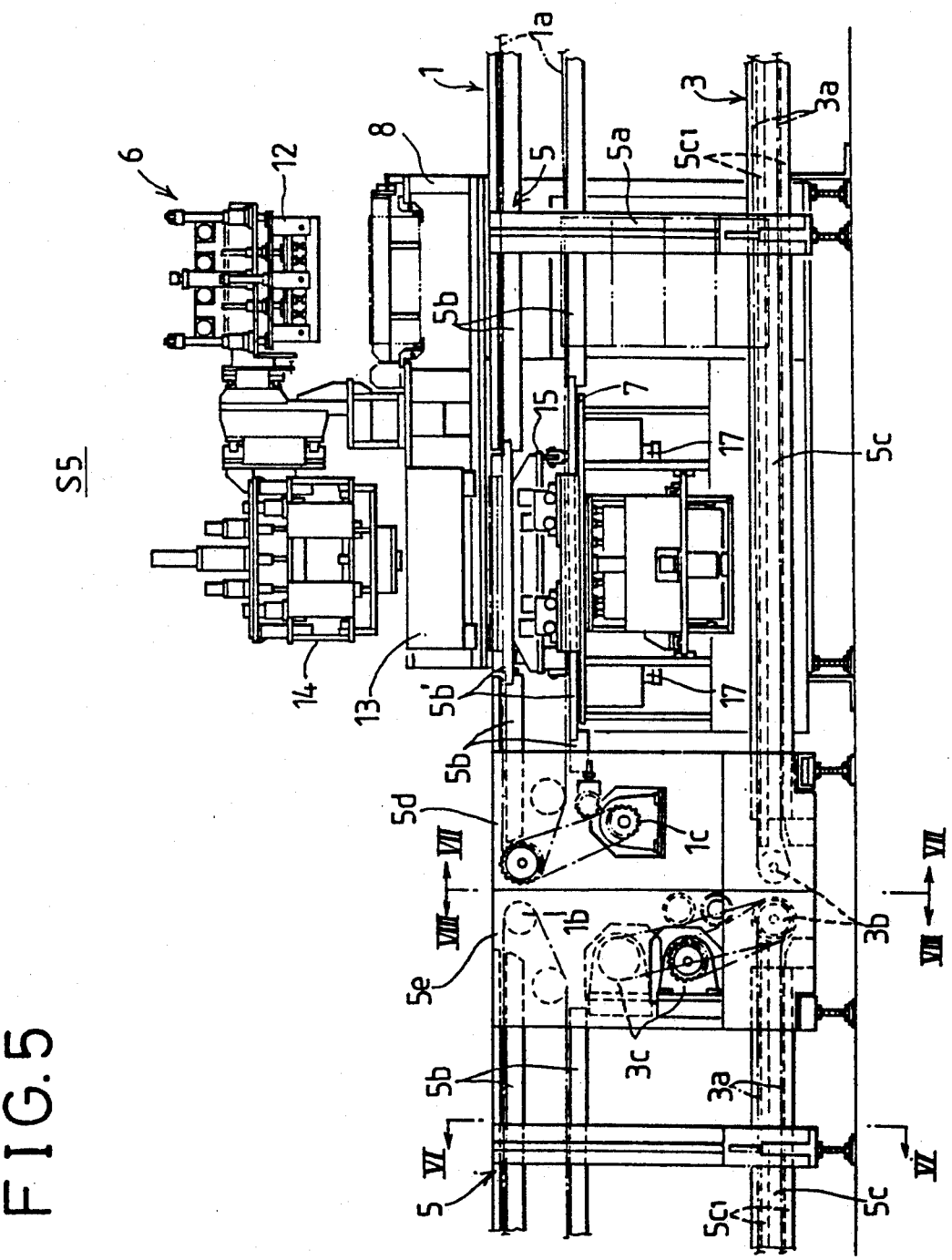
FIG. 5 is a front view thereof.

The construction of the outer frame 5 of both conveyors 1, 3 is explained below with reference to a valve assembly apparatus 6 provided at the fifth work station S5 as shown in FIGS. 3-5.

The assembly apparatus 6 has an apparatus frame 8 which is provided with a jig base 7 on the front side portion of the lateral inner side adjacent the conveyor 1 as shown in FIGS. 3 through 5, when the assembly line is regarded to extend front and rear in the longitudinal direction. A feeding chamber 10 for feeding parts-pallets 9 which carry valves d, and a discharging chamber 11 on the laterally inner side of the feeding chamber 10 are provided in an inner space on a rear side of the apparatus frame 8. The parts-pallets 9 are lifted from the feeding chamber 10 and are transported to a parts-pickup position at an upper end of the discharging chamber 11. The valves d are picked up out of the parts-pallets 9 by a transfer unit 12. The transfer unit 12 is laterally movably provided on an upper rear side portion of the apparatus frame 8. The valves d are handed over to a longitudinally movable receiving unit 13 which is provided on an upper inner side portion of the apparatus frame 8. The valves d are moved longitudinally, via the receiving unit 13, to an assembly unit 14 which is provided on an upper front side portion of the apparatus frame 8 and are picked up by the assembly unit 14. The assembly unit 14 is movable towards and away from the jig base 7.

A jig 15 is provided, as described hereinafter in detail, for positioning the pallets P which are placed on the transport conveyor 1. The jig 15 is movable upwards and downwards by a cylinder 17 about a supporting shaft 16a of swing arms 16 which are connected to the jig 15. Through the upward movement of the jig 15 the pallet P is lifted from the conveyor 1 in order to hold the cylinder head W on the pallet P in an inclined posture such that the valve guide $W_1$ is aligned vertically. In this condition, a valve d is inserted by the assembly unit 14 into the valve guide $W_1$, from the upper side.

Figure 6:
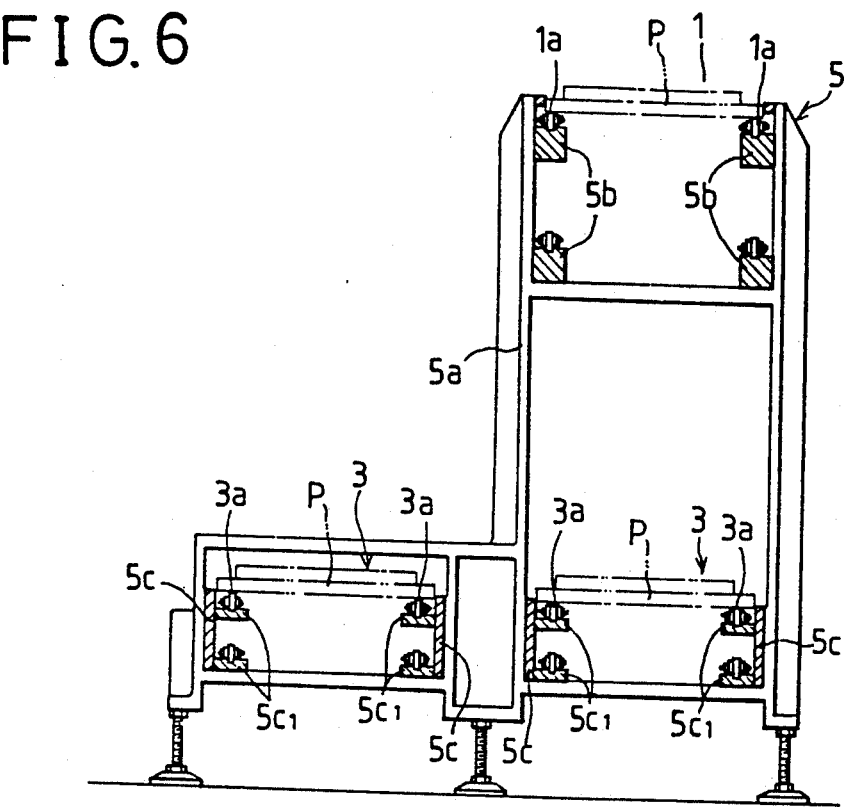
FIG. 6 is a sectional side view taken along the line VI—VI of FIG. 5.

The transport conveyor 1 and the return conveyor 3 include respectively, a pair of right and left roller chains 1a, 3a. Each of the outer frames 5 comprises a plurality of portal-shaped supporting frames 5a, as shown in FIG. 6, which are disposed at a predetermined pitch in the longitudinal direction of the assembly line to form one section, a pair of right and left chain guides 5b for the transport conveyor 1, the chain guides 5b being extended between upper portions of the supporting frames 5a, and a pair of right and left side plates 5c having chain guides $5c_1$ for the return conveyor 3, the side plates 5c being extended between lower portions of the supporting frames 5a. The outer frame 5 is constructed such that the jig base 7 is inserted into a framed space under the chain guides 5b (FIG. 4). In this embodiment, a pair of return conveyors 3, 3 are installed in parallel to each other so that one of them is selectively operated depending on the kind of workpieces with the pallets corresponding to the other kind of workpieces being kept in stock on the return conveyor 3 which is not being operated.

Figure 7:
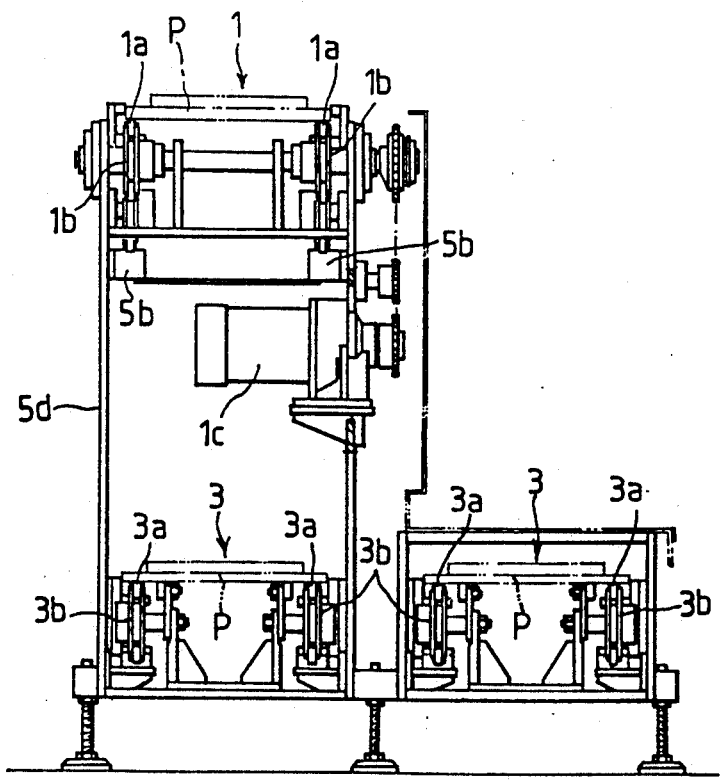
FIGS. 7 and 8 are side views of the conveyor as seen from the lines VII—VII and VIII—VIII respectively in FIG. 5.
Figure 8:
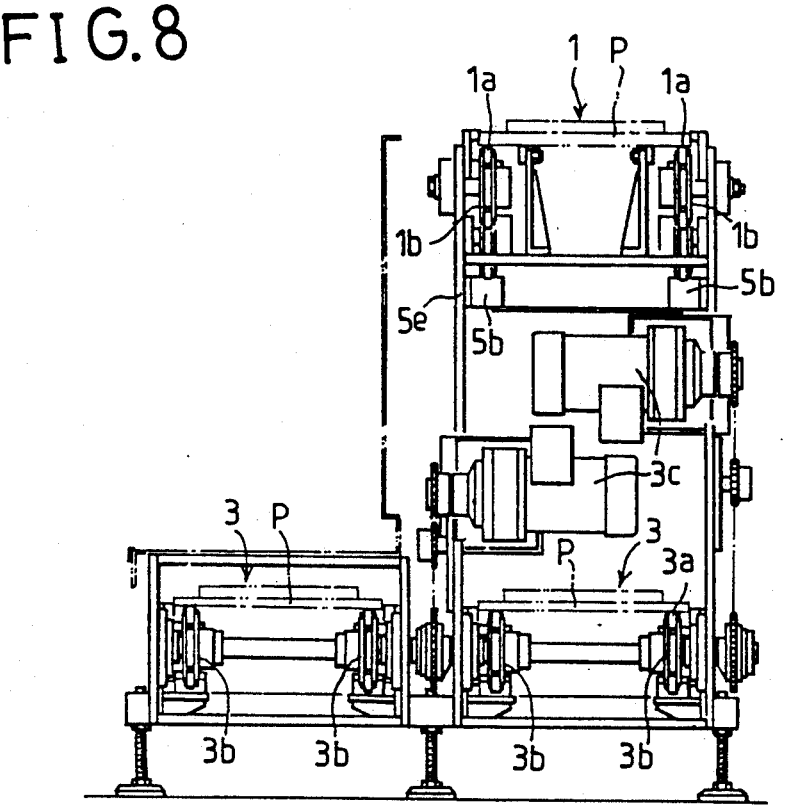

Supporting frames 5d, 5e are provided at the front and the rear ends of each outer frame 5, for sprockets 1b, 3b around which chains 1a, 3a for the conveyors 1, 3 are wound. As shown in FIG. 7, a driving motor 1c is mounted on the supporting frame 5d at the front end which drives that sprocket 1b for the transport conveyor 1 which is rotatably supported at an upper portion of the supporting frame 5d. As shown in FIG. 8, a pair of driving motors 3c, 3c are provided on the supporting frame 5e at the rear end for driving those sprockets 3b, 3b for the return conveyors 3, 3 which are rotatably supported on both lower sides of the supporting frame 5e.

The jig base 7 is provided, in addition to at the fifth work station S5, at the second, third, sixth, eighth and ninth work stations. Those portions 5b' of the chain guides 5b for the transport conveyor which correspond to the work stations S2, S3, S5, S6, S8 and S9 are made separable from the outer frame 5. After having installed the outer frame 5 with the portions 5b' separated, those portions 5b' are mounted between the front and the rear chain guides 5b by longitudinally inserting them into the space above the jig base 7 at the particular station such that those portions 5b' do not interfere with those devices on the jig bases 7 which are described later.

Figure 9:
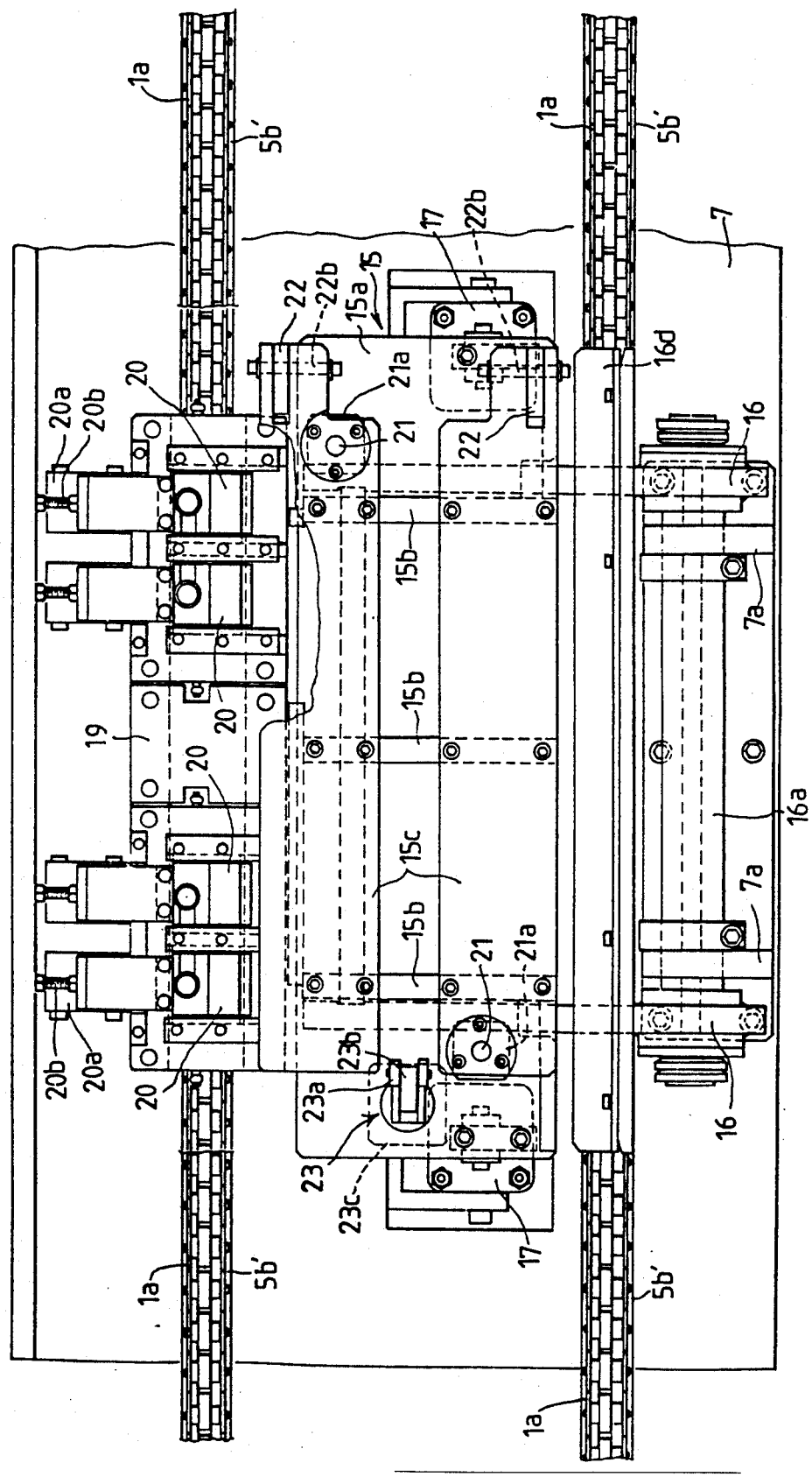
FIG. 9 a plan view of a jig base portion.
Figure 10:
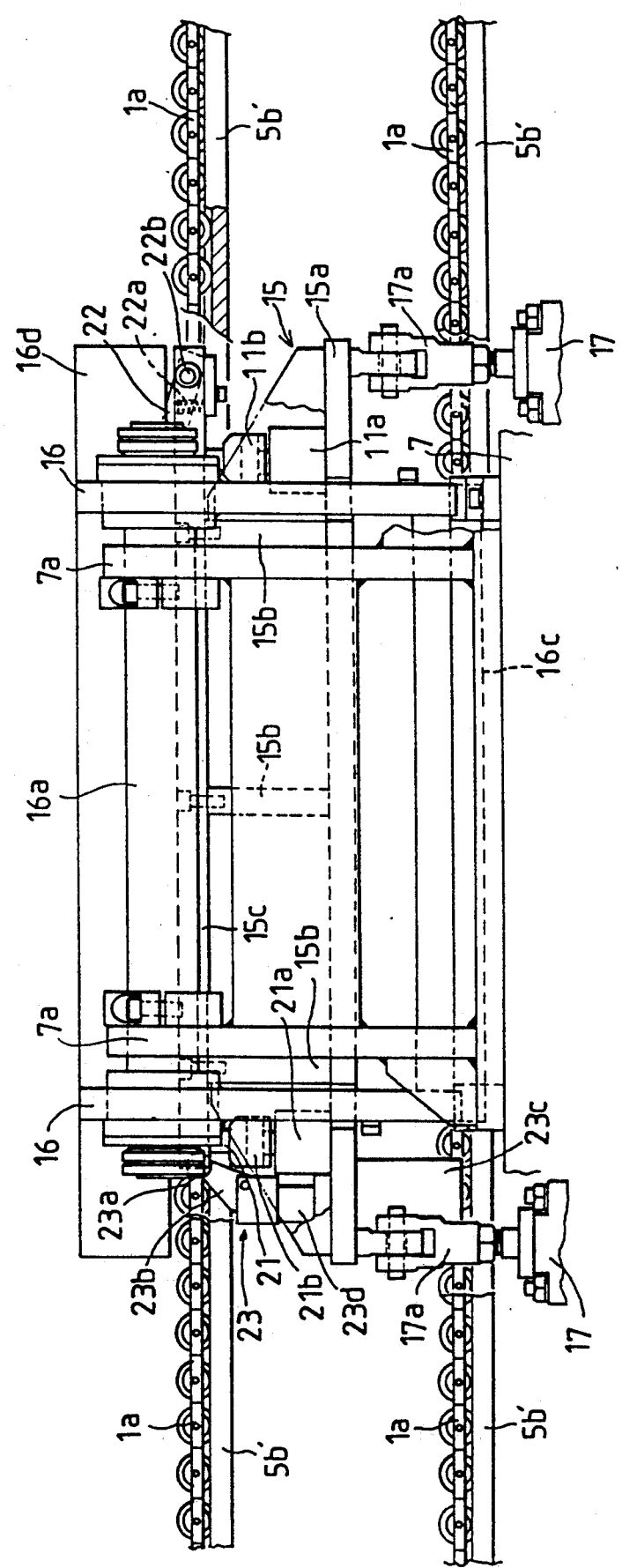
FIG. 10 is a front view of the jig base portion shown in FIG. 9.
Figure 11:
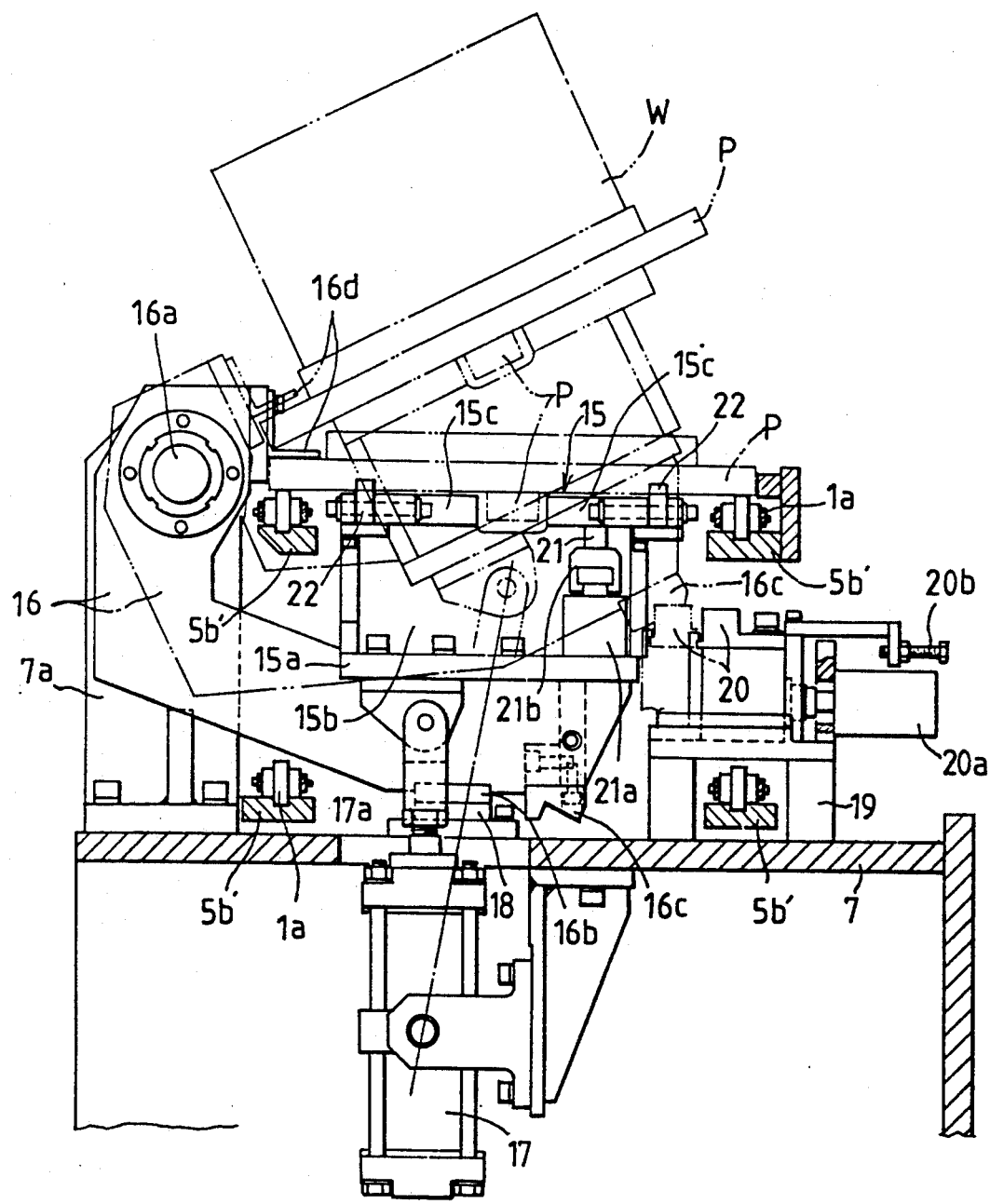
FIG. 11 is a right side view of the same.

Next, the specific construction of the jig base 7 is explained with reference to FIGS. 9 through 11.

A pair of front and rear leg pieces 7a, 7a are vertically provided on the side of the jig base 7 adjacent the work station and are located outside one of the roller chains 1a which constitute the transport conveyor 1. A supporting shaft 16a which is parallel to the chain 1a is provided between the leg pieces 7a, 7a at substantially the same level as the transport level of the pallets P. Swing arms 16 which are substantially L-shaped are supported at the front and the rear ends of the supporting shaft 16a. The jig 15 is mounted on the movable ends of the swing arms 16, 16 so as to be positioned between the right and left chains 1a, 1a.

The jig 15 comprises a plurality of wall plates 15b which are vertically mounted on a bottom plate 15a which is fixed to the swing arms 16, 16, and a pair of right and left upper plates 15c, 15c which are mounted on top of the wall plates 15b with a clearance therebetween for allowing a projection $P_1$ to pass therethrough, the projection $P_1$ being provided at the front bottom end in the center of the pallet P. Piston rods 17a, 17a of a pair of front and rear cylinders 17, 17 are connected to the bottom of both ends of the bottom plate 15a. The cylinders are attached to the jig base 7 so that the jig 15 can be moved upwards and downwards with the cylinders 17 as a driving source.

The upper plates 15c are positioned slightly below the transport level of the pallets P when the jig 15 is in a lowered position. At the lowered position, stopper-seats 16b provided at the bottom of the swing arms 16 come into contact with stoppers 18 provided on the jig base 7. After the jig 15 is lifted from the lowered position to a predetermined level through the space between the right and left chains 1a, 1a, movable stoppers 20 are moved towards the inner direction to support the jig 15 in place as described below. The movable stoppers 20 are mounted on a support base 19 which is located on the side of the jig base 7 opposite to the leg pieces 7a, 7a of the jig base 2. The movable stoppers 20 are movable forwards and backwards by cylinders 20a. After the movable stoppers are in position, the jig 15 is lowered from the predetermined level until seat-plates 16c extendedly provided on the movable ends of the swing arms 16, 16 contact the movable stoppers 20 so that the jig 15 is positioned and held at a lifted position.

In this embodiment, two pairs of the movable stoppers 20 are provided respectively in the front and the rear portions of a support base 19. One pair of the movable stoppers 20 are made to have a height different from that of the other pair, so that the lifted position of the jig 15 can be changed over in two stages depending on the kind of workpieces. Adjusting screws 20b are provided to restrict the forward position of the movable stoppers 20. Pressing plates 16d are extended between the upper ends of both swing arms 16, 16 to prevent the pallet P from being lifted upwards.

A pair of diagonally positioned locating pins 21 are provided on the jig 15 and are connected to cylinders 21a on the bottom plate 15a via hooks 21b. Each of the locating pins 21 can be projected above and withdrawn below the upper plate 15c by the cylinder 21a.

In the rear of the upper plates 15c, 15c, claw pieces 22 which are urged upwards by springs 22a are rotatably mounted for movements upwards and downwards about shafts 22b at the rear end thereof. Further, in the front portion of the jig 15, there is provided a stopper member 23 having at its upper end thereof a lever 23b with a roller 23a. The stopper member 23 is moved upwards and downwards by a cylinder 23c mounted on the bottom plate 15a. By action of the cylinder 23c, the stopper member 23 moves between an operating position in which the roller 23a is within the travel path of the projection $P_1$ of the pallet P and a clearing position which is positioned below the above-mentioned operating position. A shock absorber which urges the lever 23b to a rearwardly inclined posture is provided in a piston rod 23d of the cylinder 23c so as to make it possible to push the pallet P backwards via the lever 23b.

According to the above construction, when the pallet P is transported to the work station by the transport conveyor 1 while keeping the jig 15 in the lowered position, the claw pieces 22 are pushed downwards by the leading edge of the pallet P. When the pallet P has passed over the claw pieces 22, they are moved upwards by the springs 22a. The roller 23a of the stopper member 23 is in its operating position and contacts the projection $P_1$ at the front lower portion of the pallet P. The forward movement of the pallet P is restricted by the resilient operation of the lever 23b through the shock absorber. Then the pallet P is pushed backwards by the lever 23b while sliding on the roller chains 1a, 1a, until the rear end of the pallet P is engaged with the claw pieces 22, and the pallet P is stopped at a predetermined stop position defined by the claw pieces 22.

Next, the locating pins 21 are moved upwards to fit them into locating holes at the bottom of the pallet P, thereby fixing the position of the pallet P relative to the jig 15. Then, the jig 15 is lifted from the lowered position and the pallet P on the transport conveyor 1 is lifted while being placed on the upper plates 15c. The jig 15 is then fixed at the lifted position by means of the movable stoppers 20.

At this time the pallet P is laterally tilted by the swinging angle of the swing arms 16. The cylinder head W on the pallet P is supported in a predetermined inclined posture such that the valve guide $W_1$ is vertically aligned. In this condition, the assembling work of the valve and the associated parts, such as the valve spring and the like is performed, as described above.

After the assembling work has been finished, the movable stoppers 20 are moved outwards and the jig 15 is lowered to the lowered position. The locating pins 21 are lowered and, at the same time, the stopper member 23 is lowered to the clearing position. According to this construction, the pallet P is transported out of the work station by being placed on the constantly operated transport conveyor 1.

As described above, according to this invention, workpieces can be transported to a plurality of work stations by a single transporting conveyor. It has, therefore, an effect that the cost of transporting apparatus can be reduced and that the installation work of the conveyor and the changes in the pitch of the work stations can be easily accomplished.

It is readily apparent that the above-described has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A working line having a plurality of work stations arranged in series and a free-flow transport conveyor means for transporting work pieces to said work stations, wherein:
   an outer frame to support said conveyor means is formed extending over a plurality of said work stations;
   a jig base is provided in each of said work stations and is inserted into a framed space of said outer frame;
   a jig is provided on each jig base for supporting and positioning each of the work pieces on said transport conveyor means at the respective work station; and
   wherein said transport conveyor means includes a main transport conveyor on said outer frame,
   a plurality of pallets sized to ride on said main transport conveyor, each for carrying one or more of the work pieces, and
   a return conveyor for returning empty pallets from a terminal end of said working line to a starting end thereof, said return conveyor being supported on said outer frame under said transport conveyor, and
   wherein said framed space in said outer frame is formed between said transport conveyor and said return conveyor;
   wherein said transport conveyor and said return conveyor comprise, respectively, a pair of right and left conveying members provided in parallel to each other on both lateral sides thereof;
   said outer frame comprises a plurality of supporting frames in portal shape provided at a predetermined pitch in the longitudinal direction of the working line, a pair of right and left guide members for said transport conveyor extendedly provided between upper portions of said supporting frames for guiding said conveying members of the transport conveyor, and a pair of right and left guide members for said return conveyor extendedly provided between lower portions of said supporting frames for guiding said conveying members of the return conveyor; and
   said framed space is provided between said guide members for said transport conveyor and said guide members for said return conveyor.

2. A working line according to claim 1 wherein those portions of the guide members for the transport conveyor which are located above said jig base are separable from said outer frame.

3. A working line having a plurality of work stations arranged in series and a free-flow transport conveyor means for transporting work pieces to said work stations, wherein:
- an outer frame to support said conveyor means is formed extending over a plurality of said work stations;
- a jig base is provided in each of said work stations and is inserted into a framed space of said outer frame;
- a jig is provided on each jig base for supporting and positioning each of the work pieces on said transport conveyor means at the respective work station;
- wherein said transport conveyor means comprises a pair of right and left conveying members employed to convey each of the workpieces on a pallet;
- said jig base is arranged to be inserted into a framed space formed in said outer frame under said transport conveyor means;
- swing arms are provided on said jig base and are swingable upwards and downwards about a supporting shaft, said supporting shaft being provided outside one of said conveying members in parallel thereto;
- said jig supporting the pallet is mounted on said swing arms so as to be positioned between said pair of conveying members;
- locating pins for positioning the pallet are provided on said jig and are movable above and below the upper surface of said jig;
- claw pieces are pivotally provided at the rear upper portion of said jig such that said claw pieces are pushed downwards by the pallet when the pallet passes thereover and are projected upwards after the pallet has passed thereover; and
- a stopper member is provided movably upwards and downwards at the front of said jig, said stopper member having a resilient operation such that, when said stopper member contacts the front end of the pallet, said stopper member pushes the pallet backwards until the rear end of the pallet contacts said claw pieces.

* * * * *